July 24, 1956     O. W. TITUS     2,755,819
VARIABLE CAPACITY RESERVOIR
Filed March 31, 1955     2 Sheets-Sheet 1
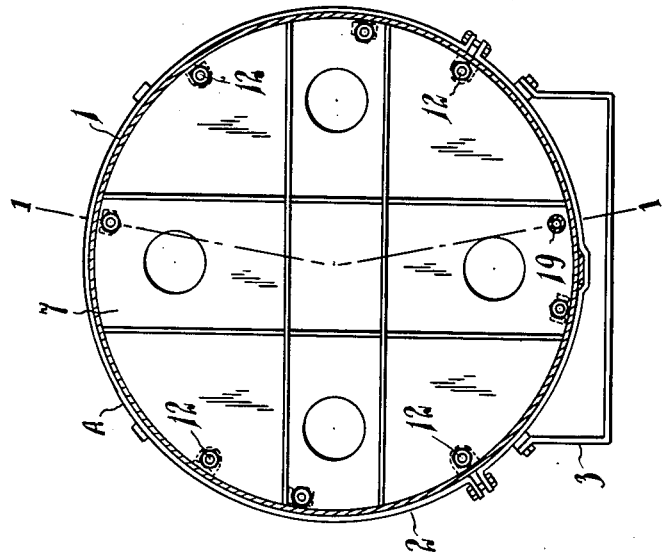
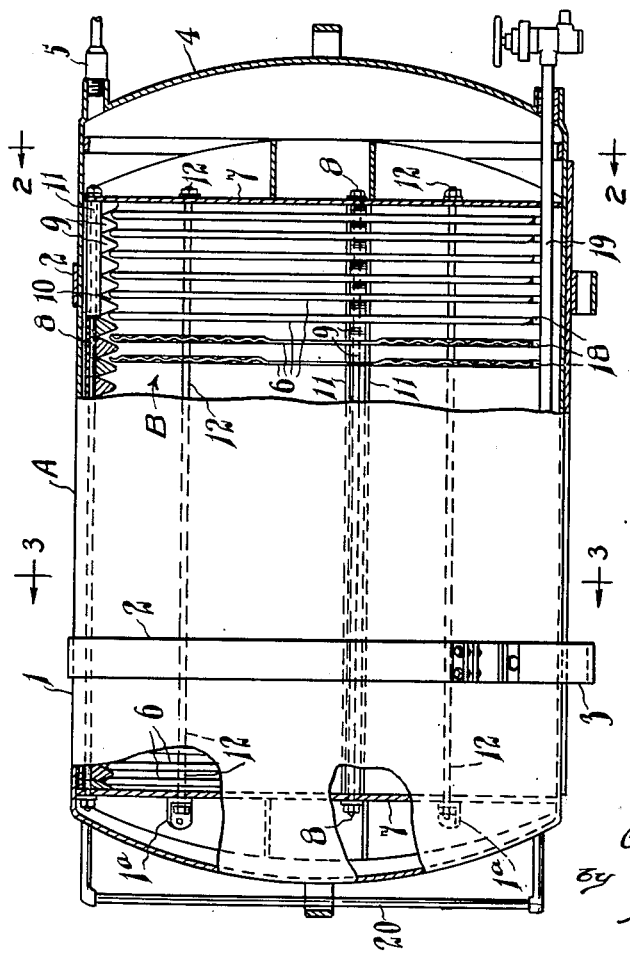
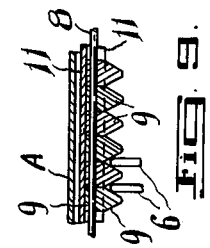
Inventor
Olcott W. Titus
ATTY.

July 24, 1956  O. W. TITUS  2,755,819
VARIABLE CAPACITY RESERVOIR
Filed March 31, 1955  2 Sheets-Sheet 2
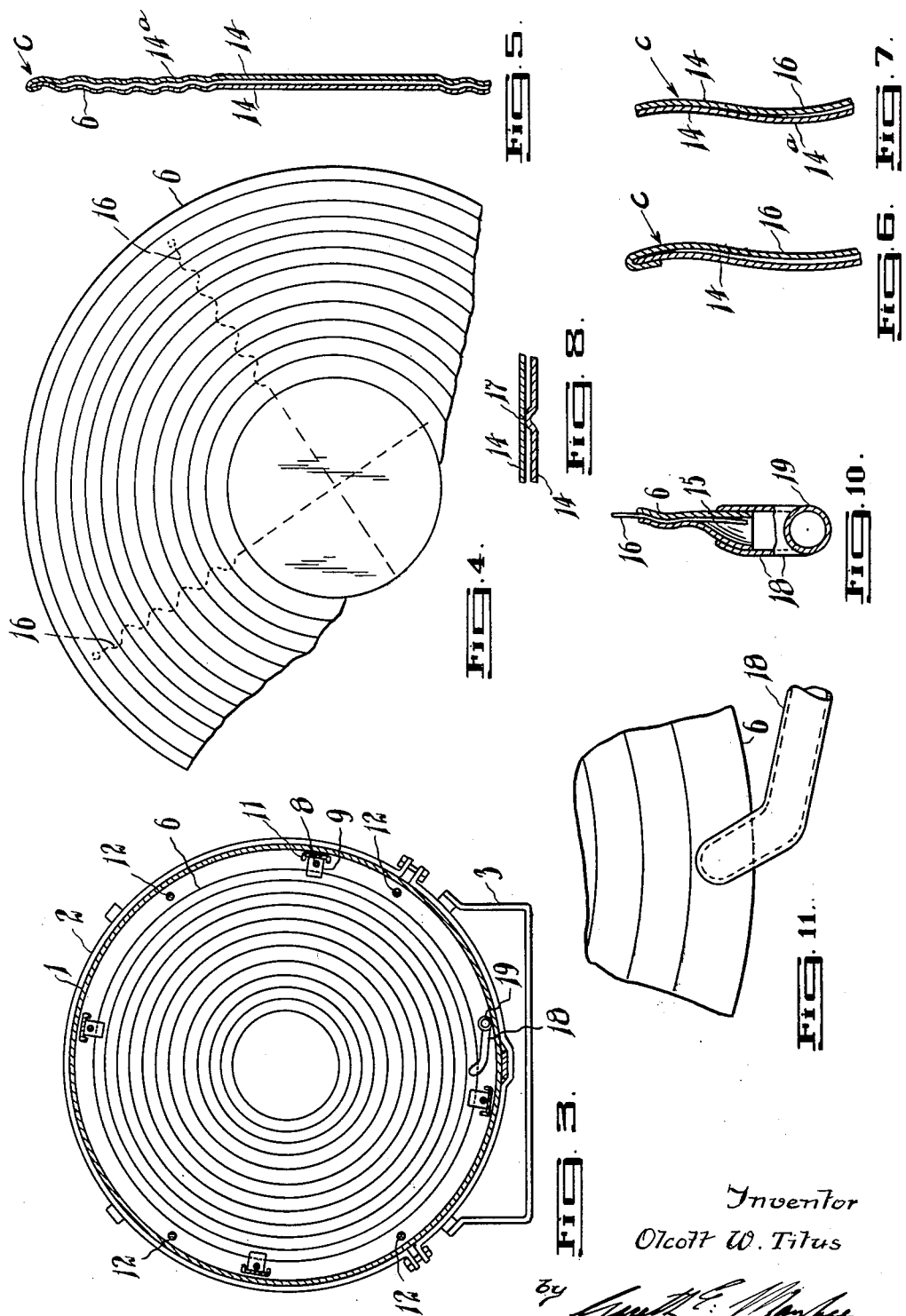
Inventor
Olcott W. Titus

United States Patent Office 2,755,819
Patented July 24, 1956

2,755,819

VARIABLE CAPACITY RESERVOIR

Olcott W. Titus, Toronto, Ontario, Canada, assignor to Canada Wire and Cable Company Limited, Toronto, Ontario, Canada, a corporation Application March 31, 1955, Serial No. 498,210

10 Claims. (Cl. 138—26)

This invention relates to variable capacity reservoirs such as are used to receive oil from high tension underground electric cables as the latter heat, and to feed the oil back to the cable as the latter cools without permitting the oil to come into contact with the atmosphere, other gases, oils, or contaminating substance. Such reservoirs in brief comprise a container and a plurality of expanding and contracting cellular elements arranged in a stack in the container.

The requirements of a reservoir for this purpose are very severe. The cellular elements must be vacuum tight and they must be capable of withstanding repeated applications of oil pressure without damage. The reservoirs at present in use, however, are subject to several disadvantages. In the first place the cellular elements have heretofore been constructed so that there is always a very considerable quantity of dead or excess oil left therein even when the cable has received the maximum amount required under the coldest condition under which the cable is used and since the expansion and contraction of this dead oil under changes in ambient temperatures must be provided for, the effective capacity of the reservoir is substantially reduced. Furthermore, the space occupied by this dead or excess oil increases the overall size of the reservoir and when the reservoir functions as a "balanced pressure type" reduces the amount of gas space inside the outer container and external to the cellular elements with resultant reduction in the range of use of the reservoir.

I have further found that when it is attempted to make a cellular element in which the two halves nest together to give this minimum dead oil advantage, it is essential that the marginal area of the element beyond the outermost corrugation be dished slightly in a direction opposite to the direction of curvature of the outer corrugation, in order to prevent buckling or localized bending of the crest of the outermost corrugation during operating cycles. Such buckling will cause early fatigue failure where it occurs.

I have further found that rigid mounting of such dished cellular elements promotes such buckling. My method of mounting is such that these elements are not confined while expanding and contracting, but are loosely supported in a frame as described hereafter.

My object, therefore, is first to devise an improved form of cellular element which will expand without fatiguing to contain all the necessary oil to be accommodated due to the heating of the cable, but which will contain a minimum of oil when the cable is cold, and thus keep the reservoir size to a minimum and give a maximum of gas space within the outer container when such a gas space is desirable, and second, to devise a method of mounting the cellular elements so that they are allowed full freedom of expansion and contraction under normal working conditions.

I attain my object by means of the constructions hereinafter described and illustrated in the accompanying drawings in which Fig. 1 is a side elevation of the reservoir, partly broken away on the line 1—1 in Fig. 2;

Fig. 2 a section on the line 2—2 in Fig. 1;

Fig. 3 a section on the line 3—3 in Fig. 1;

Fig. 4 a plan view, partly broken away, of one of the cellular elements;

Fig. 5 a cross section through the same;

Fig. 6 an enlarged sectional detail of part of a cellular element;

Fig. 7 an enlarged sectional detail showing a slightly modified arrangement of cellular element;

Fig. 8 an enlarged sectional detail of part of a cellular element showing a further modification;

Fig. 9 an enlarged fragmentary section through the wall of the tank showing more clearly than in Fig. 1, the relative position of the parts;

Fig. 10 a fragmentary cross section, partly in elevation, through a cellular element showing the connection of the nipple; and Fig. 11 a fragmentary plan view of a cellular element showing the connection of the nipple.

In the drawings like numerals of reference indicate corresponding parts in the different figures.

The variable capacity reservoir comprises an outer container A and a bank B of cellular elements. The container A may be filled with a confined gas or connected with the atmosphere or filled with "gauge" oil which in turn is exposed to atmospheric pressure, while the interiors of the cellular elements are connected with an electric cable to receive the oil therefrom as said cable heats and supply oil thereto as the cable cools.

The container A is shown as a cylindrical tank 1 and is provided with circumferential bands 2, to which are secured supporting brackets or legs 3. The tank, it will be noted, is provided with a head 4 normally welded to the main shell. The head of the tank is shown with an inlet connection 5 through which the tank may be filled or exhausted of gas or liquid. Depending on conditions the tank may be sealed and may contain an expansible and compressible gas or may be vented to the atmosphere and contain air or oil.

The bank B comprises a plurality of cellular elements 6 which are held in position relative to one another by a cage comprising a pair of head members 7, 7 connected with tie rods or bolts 8, but held in proper spaced relationship by channel members 11. On these tie rods are mounted a series of spacer wedges 9, preferably of wood, or notched wooden or metal strips, and the edges of the cellular elements are loosely fitted in the spaces 10 formed between the wedges or by the notches.

The butts or thick outer ends of the spacer wedges 9 are received in the channel members 11, which thus hold said spacer wedges from rotation on the tie rods.

The bank B is held in place within the tank 1 as follows. Positioning rods 12 are secured to brackets 1ᵃ on one end of the tank, and the bank is slidably mounted on these rods, the head members 7 being provided with holes to receive the rods.

It will be noted from the construction above described that the bank B as a whole is held firmly in place in the tank 1, but that the individual cellular units, while retained in their relative positions, are not rigidly gripped at any point other than the opening 15 hereinafter referred to, and that the danger of fatiguing of the metal is therefore materially reduced.

A very important feature of the invention is the construction of the individual cellular elements. Each element is formed of a pair of metal discs 14, the central portion of which is flat and the outer portion formed with annular corrugations 14ᵃ. One of the discs may be somewhat larger than the other, and the edge portion of this larger disc spun or otherwise bent over the edge of the smaller disc to secure the two discs together, as will be seen in Fig. 6. The joint thus formed is welded, silver soldered, or otherwise made gas and liquid tight. Alternately, as shown in Fig. 7, similar discs may be used and the edges welded or again, alternatively, an electric seam weld may be made near the outer edges of the discs.

It will be noted from Fig. 5 that the corrugations on the one disc are arranged to nest within the corrugations on the other disc, and thus will permit the discs to substantially contact when the cellular element is empty. This feature is important as it means that the cellular element may substantially empty itself of oil.

To prevent localized bending resulting in fatiguing of the metal and breaking of the cellular element adjacent its periphery, the marginal area of the element beyond the outermost corrugation (marked C in Figures 5, 6 and 7) is dished in a direction opposite to the direction of curvature of the outermost corrugation. This prevents buckling and breaking of the crest of the outermost corrugation during operating cycles.

Each cellular element is provided with an opening 15, which acts as an inlet and outlet, and as there is a danger that the discs at a point near the outlet may contact and thus prevent escape of gas during the initial evacuating cycle from the remote portion of the element, it is desirable to provide some means for preventing the complete collapsing of the element adjacent the opening.

This means may be in the form of fine soft wires 16 extending radially of the element and secured at their ends to the element. These are shown in the drawings arranged in the form of a cross, but any other suitable arrangement may be employed. These wires are of a gauge large enough to hold the discs sufficiently apart that the portions of its interior remote from the outlet may be exhausted of air or other gas prior to charging the cells with oil.

In Fig. 8 a slightly modified arrangement is shown in which one of the discs is formed with fine radially extending ribs 17 which prevent the main portion of the inner surface of the said disc from tightly contacting with the inner surface of the other disc.

Each cellular element, as above set forth, is provided with an opening 15 which acts as an inlet and outlet, and the opening of each element is connected by a nipple 18 with a manifold 19, extending longitudinally of the bank B and having its end projecting through the head 4. These nipples are in the main of circular cross section, but have their ends split and deformed to flattened elliptical shape to fit over the openings 15, as shown in Figs. 10 and 11.

The projecting end of the manifold 19 may be provided with suitable valve and is adapted to be connected to the oil system of the electric cable.

While it forms no part of the present invention, the tank is shown as provided at one end with a gauge 20 to permit visible inspection as to the position of the gauge oil in the tank. It will be evident, of course, that a secondary tank may be mounted above the main tank and connected with the inlet 5, and the indicating gauge could be applied to the secondary tank.

To avoid fatiguing of the metal discs 14 due to the expanding and contracting of the units, the greatest movement between the discs at the center thereof when the unit is expanded is preferably limited to not more than 6% of the diameter of the discs.

The various portions of the reservoir will be formed of materials suitable for the purpose, so as to withstand the various temperatures encountered and the strains and other conditions to which the parts are subjected in use.

It will be apparent that with this improved reservoir the various cellular elements, if necessary in use, may be substantially emptied of oil, and therefore, there is no large quantity of excess or inactive oil retained in the cellular elements. This, of course, means that there will be a minimum amount of oil required in the reservoir, thus giving a greater gas space in a tank of a given size. Furthermore, any excess or inactive oil is parasitic in effect since provision must be made for its own expansion and contraction with variations in surrounding temperatures.

What I claim as my invention is:

1. An expansible cellular element comprising a pair of discs which are united with their inner surfaces in intimate contact at their peripheries to form a chamber between the discs, each of said discs having a series of annular corrugations, the tops of the corrugations of one disc being adapted to sit within the recesses of the corrugations of the other disc, and means connecting the said chamber formed between the discs to a source of fluid.

2. An expansible cellular element comprising a pair of discs which are united at their peripheries to form a chamber, each of said discs having a series of annular corrugations, the tops of the corrugations of one disc being adapted to sit within the recesses of the corrugations of the other disc; and means extending substantially radially across the discs for maintaining said discs in slightly spaced relationship when the cell is collapsed.

3. An expansible cellular element comprising a pair of discs, which are united at their peripheries to form a chamber, each of said discs having a series of annular corrugations, the tops of the corrugations of one disc being adapted to sit within the recesses of the corrugations of the other disc; one of said discs having radial ribs on its inner face to maintain the main portions of the adjacent faces of said discs in slightly spaced relationship when the cell is collapsed.

4. An expansible cellular element comprising a pair of discs which are united at their peripheries to form a chamber, each of said discs having a series of annular corrugations, the tops of the corrugations of one disc being adapted to sit within the recesses of the corrugations of the other disc; and wires arranged radially between said discs to maintain the main portions of the adjacent faces of said discs in slightly spaced relationship when the cell is collapsed.

5. A reservoir comprising a plurality of cellular elements, and a container therefor, said container comprising a pair of heads and longitudinal members connecting said heads, said longitudinal members having a plurality of spaced positioning members projecting inwardly therefrom to loosely receive between them the edges of said cellular elements.

6. A reservoir comprising a plurality of cellular elements, and a container therefor, said container comprising a pair of heads and longitudinal members connecting said heads, said longitudinal members having a plurality of wedge shaped members mounted thereon, the spaces between the wedge shaped members forming recesses in which the edges of the cellular members are loosely received.

7. A reservoir comprising a plurality of cellular elements and a container therefor, said elements being loosely supported on a common axis in said container but in definite spaced relationship; each of said cellular elements comprising a pair of discs which are united at their peripheries to form a chamber, each of said discs having a series of annular corrugations, the tops of the corrugations of one disc being adapted to sit within the recesses of the corrugations of the other disc; and means extending substantially radially across the disc for maintaining said disc in slightly spaced relationship when the cell is collapsed.

8. An expansible cellular element comprising a pair of discs which are united at their peripheries to form a chamber, each of said discs having a series of annular corrugations, the tops of the corrugations of one disc being adapted to sit within the recesses of the corrugations of the other disc, and the marginal area of the element beyond the outermost corrugation being dished.

9. An expansible cellular element comprising a pair of discs which are united at their peripheries to form a chamber, each of said discs having a series of annular corrugations, the tops of the corrugations of one disc being adapted to sit within the recesses of the corrugations of the other disc, and the marginal area of the element beyond the outermost corrugation being dished in a direction opposite to the direction of curvature of the outermost corrugation.

10. A reservoir comprising a container, a pair of positioning elements secured in spaced relationship along the inner wall of the container, and a cellular element comprising a pair of discs which are united with their inner surfaces in intimate contact at their peripheries to form a chamber between the discs, each of said discs having a series of annular corrugations, the tops of the corrugations of one disc being adapted to sit within the recesses of the corrugations of the other disc, the cellular element being mounted in the container with its edge between the positioning elements, the distance between the positioning elements being greater than the thickness of the edge of the cellular element, whereby the cellular element is loosely held in position by the positioning elements.

References Cited in the file of this patent

UNITED STATES PATENTS

| 1,823,731 | Eby | Sept. 15, 1931 |
| 1,978,233 | Shanklin | Oct. 23, 1934 |

FOREIGN PATENTS

| 3,111 | Australia | Aug. 4, 1926 |
| 642,989 | Germany | June 1, 1935 |